United States Patent [19]
Duval

[11] Patent Number: 5,933,858
[45] Date of Patent: Aug. 3, 1999

[54] EFFICIENT INTERNAL ADDRESS ENCODING SCHEME FOR AN INTEGRATED CIRCUIT WHICH FACILITATES MULTIPLE ADDRESSING MODES

[75] Inventor: David R. Duval, Lake Montezuma, Ariz.

[73] Assignee: Xerox Corporation, Stamford, Conn.

[21] Appl. No.: 08/725,798

[22] Filed: Oct. 4, 1996

[51] Int. Cl.⁶ .................................................. G06F 12/06

[52] U.S. Cl. .............................................. 711/211; 711/5

[58] Field of Search .................................... 711/1, 5, 211

[56] References Cited

U.S. PATENT DOCUMENTS

| | | | |
|---|---|---|---|
| 5,355,335 | 10/1994 | Katsuno | 365/189.04 |
| 5,440,714 | 8/1995 | Wang | 711/165 |

OTHER PUBLICATIONS

Tremblay et al., "A Three Dimensional Register File For Syperscalar Processors", 1995, pp. 191–201, IEEE.

Primary Examiner—Eddie P. Chan
Assistant Examiner—Kevin L. Ellis
Attorney, Agent, or Firm—Robert Cunha

[57] ABSTRACT

An address line arrangement which uses weighted sets of mutually independent rather than binary address lines to enable the accessing of any number of targeted elements at one time. The elements in a device are divided into groups of elements. For a numerical example, assume four elements per group and eight groups per device. One set of four address lines is wired to access one or all groups in one half of the device and a second set of four lines will access one or all groups in the other half of the device. A third set of four address lines is wired to all elements and will access one, two or all elements in each group at a time. Each element is wired to one line in the first or second group and one line in the second or third group. Since all address lines can be individually turned on, one or more elements can be accessed at one time.

5 Claims, 14 Drawing Sheets

| L_G PD3 | L_G PD2 | L_G PD1 | L_G PD0 | R_G PD3 | R_G PD2 | R_G PD1 | R_G PD0 | E PD3 | E PD2 | E PD1 | E PD0 |
|---|---|---|---|---|---|---|---|---|---|---|---|
| 0 | 0 | 0 | 1 | 0 | 0 | 0 | 0 | 0 | 0 | 0 | 1 |
| 0 | 0 | 0 | 1 | 0 | 0 | 0 | 0 | 0 | 0 | 1 | 0 |
| 0 | 0 | 0 | 1 | 0 | 0 | 0 | 0 | 0 | 1 | 0 | 0 |
| 0 | 0 | 0 | 1 | 0 | 0 | 0 | 0 | 1 | 0 | 0 | 0 |
| 0 | 0 | 1 | 0 | 0 | 0 | 0 | 0 | 0 | 0 | 0 | 1 |
| 0 | 0 | 1 | 0 | 0 | 0 | 0 | 0 | 0 | 0 | 1 | 0 |
| 0 | 0 | 1 | 0 | 0 | 0 | 0 | 0 | 0 | 1 | 0 | 0 |
| Etc... | | | | | | | | Etc... | | | |

FIG. 4

| L_G PD3 | L_G PD2 | L_G PD1 | L_G PD0 | R_G PD3 | R_G PD2 | R_G PD1 | R_G PD0 | E PD3 | E PD2 | E PD1 | E PD0 |
|---|---|---|---|---|---|---|---|---|---|---|---|
| 0 | 0 | 0 | 0 | 1 | 0 | 0 | 0 | 1 | 0 | 0 | 0 |
| 0 | 0 | 0 | 0 | 1 | 0 | 0 | 0 | 0 | 1 | 0 | 0 |
| 0 | 0 | 0 | 0 | 1 | 0 | 0 | 0 | 0 | 0 | 1 | 0 |
| 0 | 0 | 0 | 0 | 1 | 0 | 0 | 0 | 0 | 0 | 0 | 1 |
| 0 | 0 | 0 | 0 | 0 | 1 | 0 | 0 | 1 | 0 | 0 | 0 |
| 0 | 0 | 0 | 0 | 0 | 1 | 0 | 0 | 0 | 1 | 0 | 0 |
| 0 | 0 | 0 | 0 | 0 | 1 | 0 | 0 | 0 | 0 | 1 | 0 |
| Etc... | | | | | | | | Etc... | | | |

FIG. 5

| L_G PD3 | L_G PD2 | L_G PD1 | L_G PD0 | R_G PD3 | R_G PD2 | R_G PD1 | R_G PD0 | E PD3 | E PD2 | E PD1 | E PD0 |
|---|---|---|---|---|---|---|---|---|---|---|---|
| 0 | 0 | 0 | 1 | 0 | 0 | 0 | 0 | 0 | 0 | 1 | 1 |
| 0 | 0 | 0 | 1 | 0 | 0 | 0 | 0 | 1 | 1 | 0 | 0 |
| 0 | 0 | 1 | 0 | 0 | 0 | 0 | 0 | 0 | 0 | 1 | 1 |
| 0 | 0 | 1 | 0 | 0 | 0 | 0 | 0 | 1 | 1 | 0 | 0 |
| 0 | 1 | 0 | 0 | 0 | 0 | 0 | 0 | 0 | 0 | 1 | 1 |
| 0 | 1 | 0 | 0 | 0 | 0 | 0 | 0 | 1 | 1 | 0 | 0 |
| 1 | 0 | 0 | 0 | 0 | 0 | 0 | 0 | 0 | 0 | 1 | 1 |
| Etc... | | | | | | | | Etc... | | | |

FIG. 6

| L_G PD3 | L_G PD2 | L_G PD1 | L_G PD0 | R_G PD3 | R_G PD2 | R_G PD1 | R_G PD0 | E PD3 | E PD2 | E PD1 | E PD0 |
|---|---|---|---|---|---|---|---|---|---|---|---|
| 0 | 0 | 0 | 0 | 1 | 0 | 0 | 0 | 1 | 1 | 0 | 0 |
| 0 | 0 | 0 | 0 | 1 | 0 | 0 | 0 | 0 | 0 | 1 | 1 |
| 0 | 0 | 0 | 0 | 0 | 1 | 0 | 0 | 1 | 1 | 0 | 0 |
| 0 | 0 | 0 | 0 | 0 | 1 | 0 | 0 | 0 | 0 | 1 | 1 |
| 0 | 0 | 0 | 0 | 0 | 0 | 1 | 0 | 1 | 1 | 0 | 0 |
| 0 | 0 | 0 | 0 | 0 | 0 | 1 | 0 | 0 | 0 | 1 | 1 |
| 0 | 0 | 0 | 0 | 0 | 0 | 0 | 1 | 1 | 1 | 0 | 0 |
| Etc... | | | | | | | | Etc... | | | |

FIG. 7

| L_G PD3 | L_G PD2 | L_G PD1 | L_G PD0 | R_G PD3 | R_G PD2 | R_G PD1 | R_G PD0 | E PD3 | E PD2 | E PD1 | E PD0 |
|---|---|---|---|---|---|---|---|---|---|---|---|
| 0 | 0 | 0 | 0 | 0 | 0 | 1 | 0 | 0 | 1 | 0 | 0 |
| 0 | 0 | 0 | 1 | 0 | 0 | 0 | 0 | 1 | 0 | 0 | 0 |
| 0 | 1 | 0 | 0 | 0 | 0 | 0 | 0 | 0 | 0 | 0 | 1 |
| 0 | 0 | 0 | 0 | 0 | 0 | 0 | 1 | 1 | 0 | 0 | 0 |
| 1 | 0 | 0 | 0 | 0 | 0 | 0 | 0 | 0 | 0 | 1 | 0 |
| 0 | 1 | 0 | 0 | 0 | 0 | 0 | 0 | 0 | 1 | 0 | 0 |
| 0 | 0 | 0 | 0 | 1 | 0 | 0 | 0 | 0 | 0 | 1 | 0 |
| Etc... | | | | | | Etc... | | | | | |

FIG. 8

| $L\_G$ $PD3$ | $L\_G$ $PD2$ | $L\_G$ $PD1$ | $L\_G$ $PD0$ | $R\_G$ $PD3$ | $R\_G$ $PD2$ | $R\_G$ $PD1$ | $R\_G$ $PD0$ | $E$ $PD3$ | $E$ $PD2$ | $E$ $PD1$ | $E$ $PD0$ |
|---|---|---|---|---|---|---|---|---|---|---|---|
| 1 | 1 | 1 | 1 | 0 | 0 | 0 | 0 | 1 | 1 | 1 | 1 |
| 0 | 0 | 0 | 0 | 1 | 1 | 1 | 1 | 1 | 1 | 1 | 1 |
| Etc... | | | | | | Etc... | | | | | |

FIG. 9

| INPUTS | | | | OUTPUTS | | | |
|---|---|---|---|---|---|---|---|
| WE | nAOP | MSB | LSB | PD3 | PD2 | PD1 | PD0 |
| L | X | X | X | L | L | L | L |
| H | L | L | X | L | L | H | H |
| H | L | H | X | H | H | L | L |
| H | H | L | L | L | L | L | H |
| H | H | L | H | L | L | H | L |
| H | H | H | L | L | H | L | L |
| H | H | H | H | H | L | L | L |

X = DON'T CARE

FIG. 15

EFFICIENT INTERNAL ADDRESS ENCODING SCHEME FOR AN INTEGRATED CIRCUIT WHICH FACILITATES MULTIPLE ADDRESSING MODES

BACKGROUND OF THE INVENTION

An addressing scheme which allows for a variety of addressing modes while using a minimum number of address lines through the use of weighted sets of mutually independent rather than binary address lines.

In a typical random access addressing circuit, a number of binary lines are decoded and used to select one of a plurality of locations. To use a numerical example, if there are 32 elements, then 5 address lines can be used to select one and only one targeted element at a time. Also, a random access memory must have a write enable line so that the write cycle will not be initiated until the address lines have settled.

A system for reducing the number of address lines for a sequentially accessed memory will use serial addressing means such as a token ring, or shift register, to pass access from one target to the next.

One place where address lines must be used is in a light emitting diode (LED) print bar in a printer, where LED's must be selected for calibration and printing. However, the typical binary addressing circuit is not suited for this use. Most importantly, the binary circuit can select only one element at a time, while in an LED print bar, several elements, or even all elements, will have to be selected at one time under certain circumstances. Another disadvantage of a typical binary scheme is that each target element must be wired differently. For a numerical example, element 1 will have to be gated at its input to react to a 00001 input while element number 15 will have to react to a 01111. This means that the input of each element will have a different set of decoding logic, which complicates the efficiency of placing and routing gates.

What is required is an addressing scheme which can target one, several or all elements, allow all of the elements to have the same input configuration for easier placement and route of gates, operate without a write enable line and accomplish this with the fewest address lines.

SUMMARY OF THE INVENTION

This invention allows a versatile addressing scheme of an array which is organized into $2^n$ groups, each group containing $2^m$ elements for a total of $2^{m+n}$ elements by using $2^m+2^n$ mutually independent address lines. For a numerical example, if m=2 and n=3, then 32 elements will need 12 address lines, four in one set of element address lines, eight in another set of group addresses. Each element is wired to two address lines, one to each set. Since any one or all lines can be turned on, the system can select elements in any one of a function of n and m different combinations that is designed into the address generator. All elements have identical input structures which are 2-input AND gates. Finally, a write enable line is not required since the write enable signal is directly coded into the $2^m$ element address lines at the address generator. The result is an addressing circuit that can access elements in predetermined combinations of groups and elements with a minimum number of lines.

The fundamental point of the invention is that weighted sets of mutually independent address lines replace binary address lines as an efficient conveyance medium between an addressing control sector and an array of addressed elements for which a multiple selection requirement as well as an individual selection requirement exists. The use of a pure set of mutually independent lines could have been used as a conveyance medium to effect a multi-element selection requirement, but would be very inefficient. In the given example, 16 lines running each way (32 unique electrical nodes) would have been required instead of the 8 lines going each way (12 unique electrical nodes) which demonstrate the teachings of this invention.

These sets of mutually independent lines can be seen to be weighted in significance relative to each other. To use the example above, (i.e., m and n), a study would reveal the "m set" to have four times the addressing significance of the "n set" in the element selection process. Where the m set of address lines qualify a particular group of four elements for selection, the n set further qualifies a single addressed element in said qualified group for selection. In a case where there are more existing elements than could be addressed via these two example sets of lines, a set more significant than the m set could be added to qualify a larger grouping of groups, hence weighting. This weighting is similar to the way that a pure set of binary lines are weighted in significance relative to each other in the element selection process of a conventional scheme. The weighted sets of mutually independent address lines of this invention might be described as the result of an optimized hybridization of binary and mutually independent encoding schemes as an address conveyance means.

It is the optimal partitioning of these sets which determines the efficiency of an embodying addressing system. In most cases, optimum efficiency (i.e., smallest quantity of addressing lines vs. smallest size of the distributed final decoding gates) would be achieved by partitioning into four mutually independent lines per set and then as many of these sets as required.

As a clarification of the meaningful difference between the node grouping into weighted sets of this invention and the node grouping into weighted sets of familiar formats such as actal or hexdecimal, it should be pointed out that these familiar formats are actually abstract representations which are nothing more than mental subgroupings of a set of binary nodes, and that within the physical domain there always remains a pure binary relationship between the members of the complete binary set. Where BCD is a special case, neither it nor the previously mentioned formats consist of mutually independent nodes which can be shown to have the capability of selecting addressed elements in multiple as well as singularly.

BRIEF DESCRIPTION OF THE DRAWINGS

FIGS. 4–9 are logic tables showing, in order, a sequence of address line outputs that will enable a sequential left to right single-element access, a sequential right to left single-element access, a sequential left to right dual-element access, a sequential right to left dual-element access, a random single-element access and a semi-global access.

FIG. 15 is a truth table for FIG. 12.

DETAILED DESCRIPTION OF THE INVENTION

This invention is a multi-mode addressing scheme in which centrally generated addressing and write-enable information is distributed via the minimum number of address lines, and which is decoded by the simplest distributed decoding logic. This scheme finds useful application within an LED array driver device (chip) for an LED print bar. As embodied within such a chip, the scheme facilitates six different addressing modes which are sequential left to right single-element access, sequential right to left single-element access, sequential left to right dual-element access, sequential right to left dual-element access, Random single-element access and semi-global access, which will be explained below.

Figure 1:
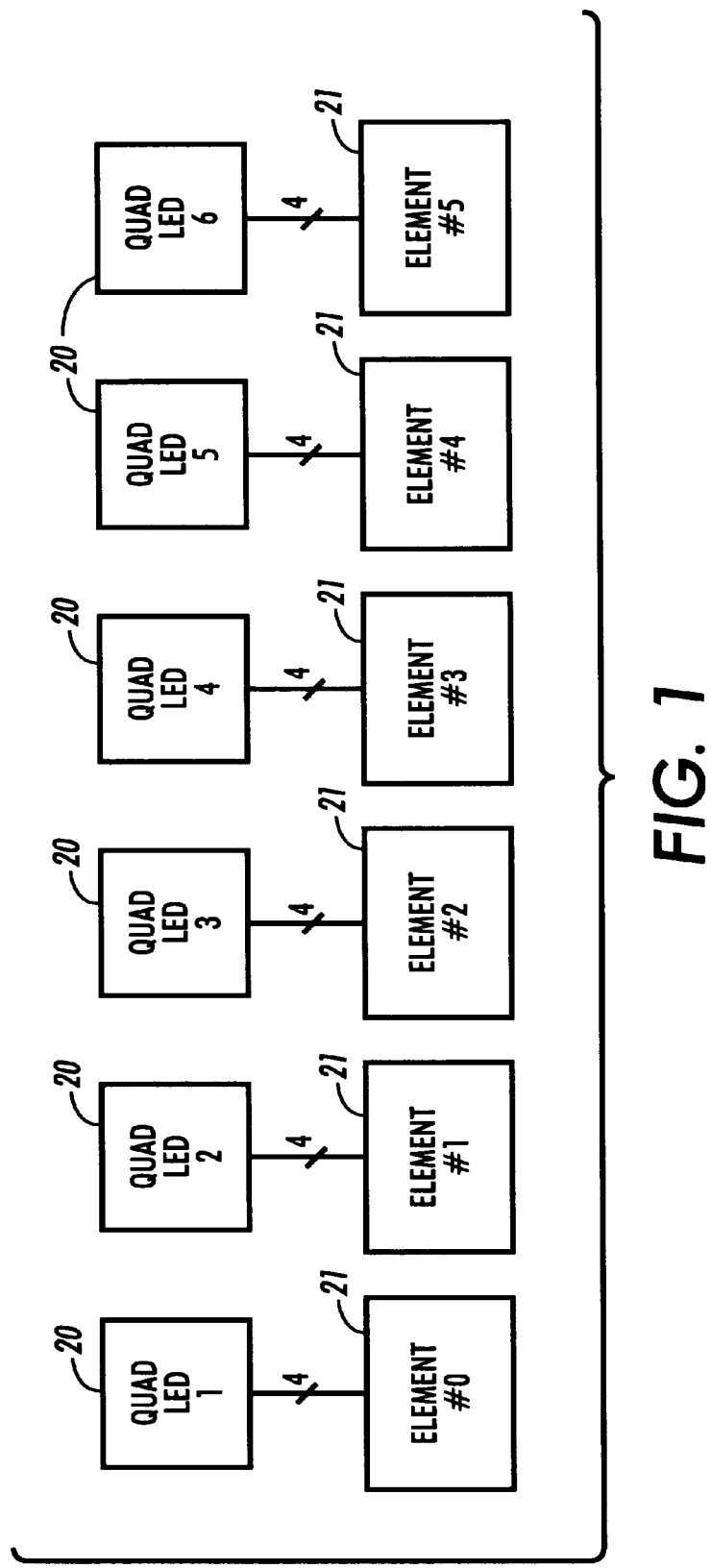
FIG. 1 shows the relative locations of a number of elements on a bar.

As shown in FIG. 1, a print bar is a relatively long and narrow device with a row of closely spaced LED's 20 which are driven by quad-driver elements 21 from both sides of the center line. Any number of elements can be addressed and loaded with data from a common 16-bit bus, not shown.

In the case of single element access mode, image data can be loaded from this 16-bit bus into the quad-driver element 21 in one clock cycle, 4 bits per driver, and in the dual access mode, two quad-driver elements can be loaded from this 16-bit bus in one clock cycle, 2 bits per driver. Two rows of quad driver elements 21 are supplied, one row on each side of the LED center row, and the elements are interleaved so that alternate LED's are connected to each row of drivers. Therefore, if image data is to be loaded sequentially from left to right, the bottom row of drivers will have to be accessed from left to right, but the top row will have to be accessed from right to left from their perspective, because they are upside down.

In this system there are two types of printing quality. In single element access mode, each LED can be driven with 4 bits of data to allow a relatively higher level of image quality. In this case one element at a time is accessed. The alternative is to use 2 bits of data for each LED, accessing two elements at a time. In this dual access mode the image quality is lower, but the print speed is twice as fast.

For coarse calibration, where a number of elements are calibrated as a unit, a semi-global number of elements, such as 16 out of 32 elements, can be selected. During the fine calibration mode, the elements are individually calibrated, which requires individual random access of each element.

Figure 2:
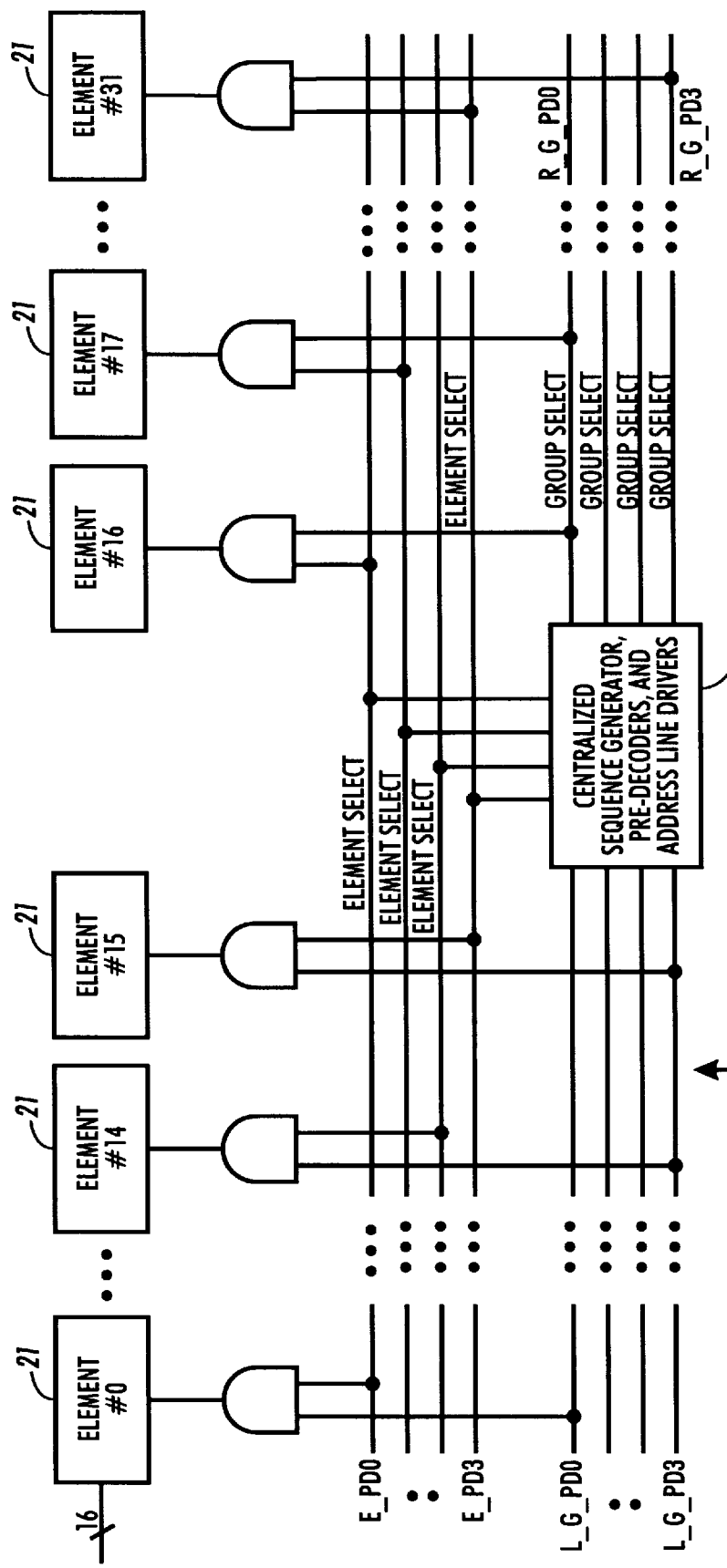
FIG. 2 is a partial simplified schematic of a set of 32 elements.

This invention, shown in more detail in FIG. 2, reduces the size of the distributed coding logic and adds functionality to the typical binary encoding scheme by converting each pair of binary bits (bit field) of external address information into four mutually independent bits which are sent over pre decode lines. Continuing with the numerical example, the total of 32 elements are divided into 8 groups of 4 elements each, 4 groups in the left half, 4 groups in the right half. One external signal selects either the 4 groups of the left half (L_G_PD) or the 4 groups of the right half (R_G_PD), and another set of signals selects one or a number of elements and/or groups at a time. By turning ON one or several lines in each set of addresses, the individual elements can be selected in groups of 1, 2 or 16 elements, and the selection process can progress from the left or right. Also, as stated above, the address lines are ANDed to the write enable within the logic block 22 so that the address information is settled before any one element is turned on, and therefore no additional write enable line is needed. In fact, this write enable line is only needed to be ANDed to one of the two sets of mutually independent address lines (element or group), since only one line at the two input AND gate being LOW will block the element. It can be noted here that random logic 22 is needed in only one central location, as opposed to an ordinary addressing configuration where each element 21 needs its own decoding gates.

Figure 3:
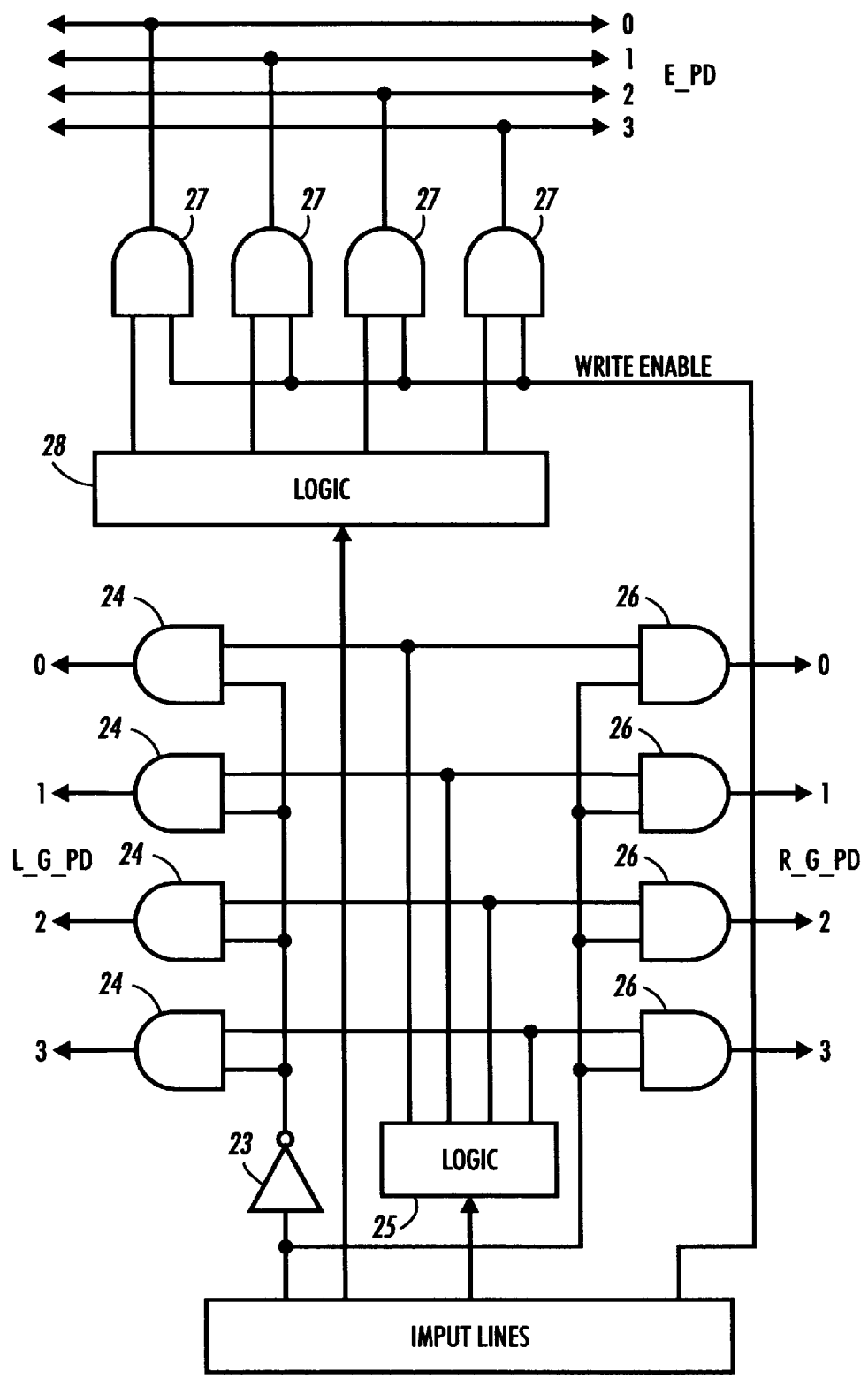
FIG. 3 is a simplified schematic diagram of the address generator of FIG. 2.

FIG. 3 is a simplified schematic of the address generator 22. One input line is supplied to gate 23 to determine whether the right or left half of the device will be enabled. Additional input lines are applied to logic 25 which decides, within the enabled half, which particular one or all of the four left or right half groups will be selected. Finally, input lines to logic 28 decide, within the selected groups of four elements, which 1, 2 or 4 elements will be selected. As discussed above, the write enable signal is wired into the inputs of gates 27 so that no data can be delivered to any element until the addresses are settled.

FIG. 4 is a table showing how the lines are activated to provide one example of a sequence, in this case the first seven steps in a sequential left to right single element access. Since for the duration of this sequence the accesses will all be in the left half of the device, all of the right group address lines in the center of the table, R_G_PD0–3, will be shown as being OFF (0). In lines 1–4 of this table the left group (L_G_PD0) line 0 is active indicating that the leftmost group of four elements has been selected, and in the right side of the table lines 1–4 show that the first 4 elements are sequentially accessed. The next three lines in this table show that the first three elements of the second group are accessed. This process continues until all of the elements of the device have been accessed. The tables shown in FIGS. 5 through 9 for the other possible sequences are similar. The selection sequences are best observed when the logic sequences of those tables are applied to the logic diagram of FIG. 11.

This addressing system can be scaled up or down for a system of any size. In general, if there is a total of $2^{m+n}$ elements, then there are $2^{m+n-1}$ elements per half, $2^n$ groups in total, $2^{n-1}$ group address lines for each half, $2^m$ elements per group and $2^m$ element address lines for the entire set of elements. Finally, each element will be addressed by ANDing one element line and one group line.

Figure 10A:
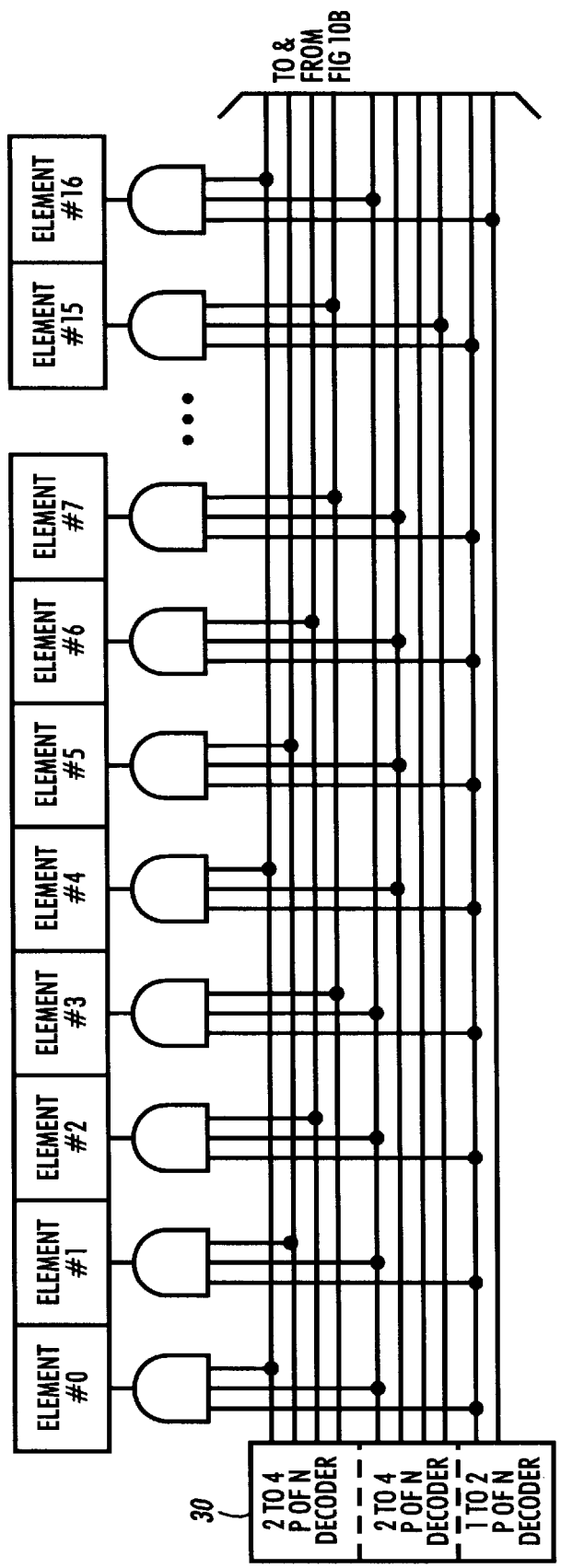
FIG. 10 shows the parts of an addressing system which embodies the teachings of this invention, but without splitting an addressing line set, as in FIG. 2.
Figure 10B:
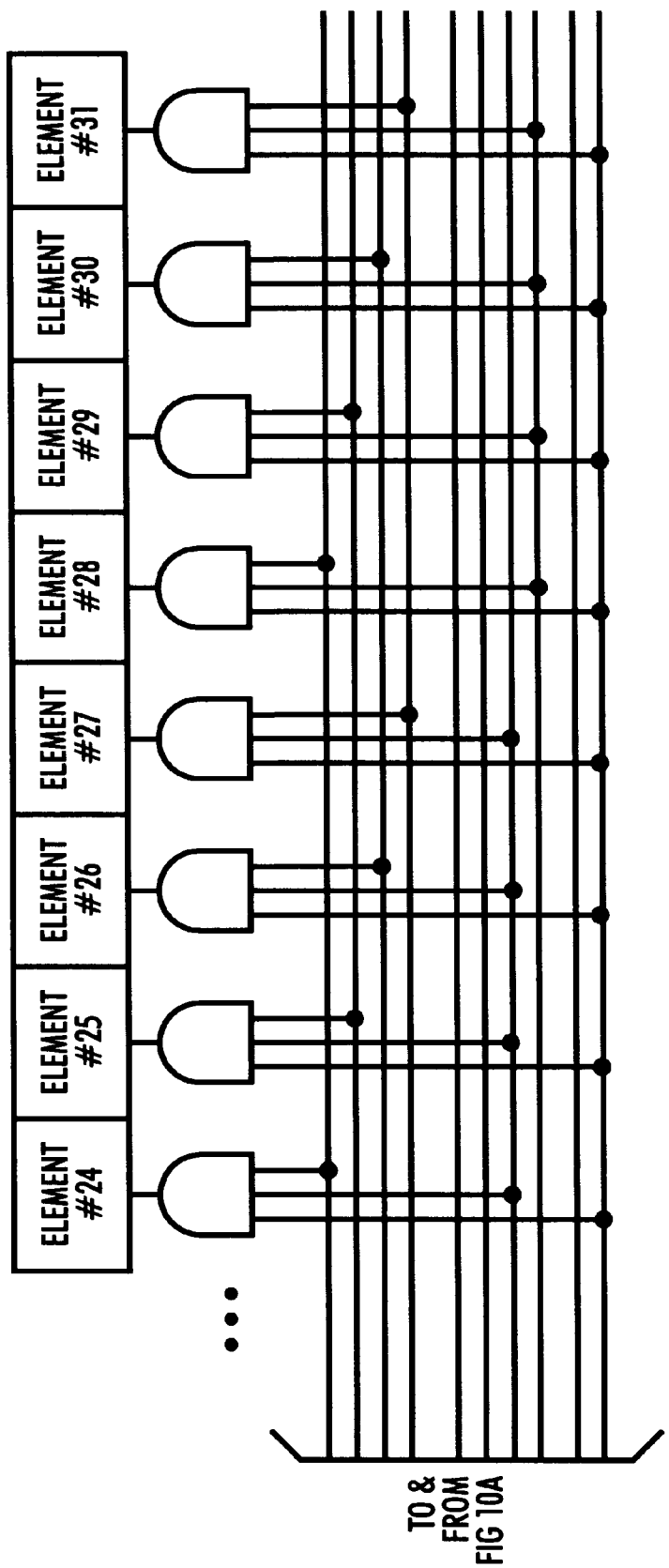

FIG. 10 shows the parts of an addressing system which embody the teachings of this invention, but without splitting an addressing line set. The depicted p of n decoders 30 are a part of an addressing control sector which can be physically connected and therefore placed anywhere with respect to the addressed elements. This system can facilitate multiple element as well as single element selection. It even allows the simultaneous global selection of all addressed elements or semi-global selection of all left half elements vs. all right half elements.

Figure 11A:
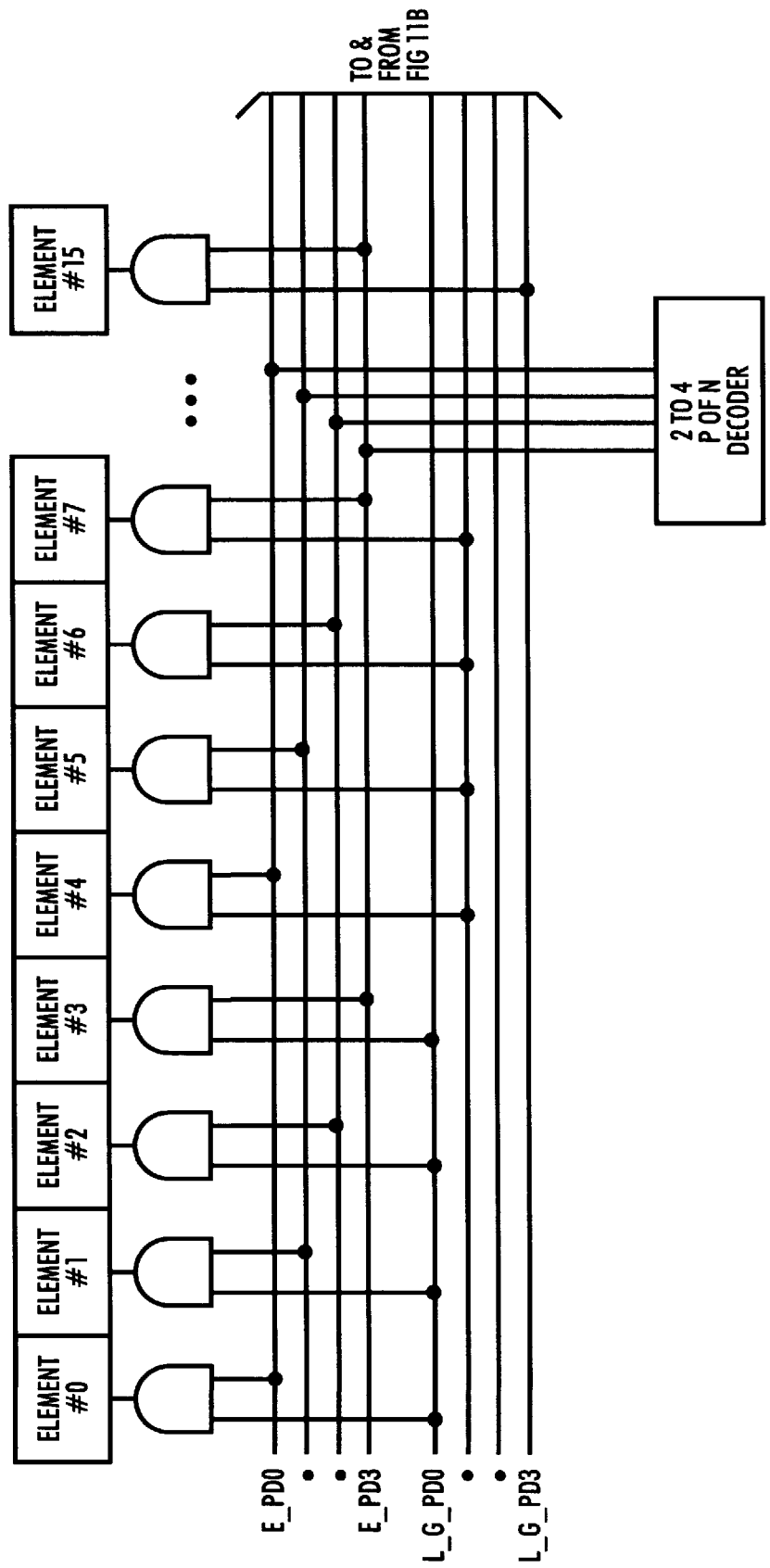
FIG. 11 demonstrates the increased efficiency afforded by splitting a set of addressing lines within a system.
Figure 11B:
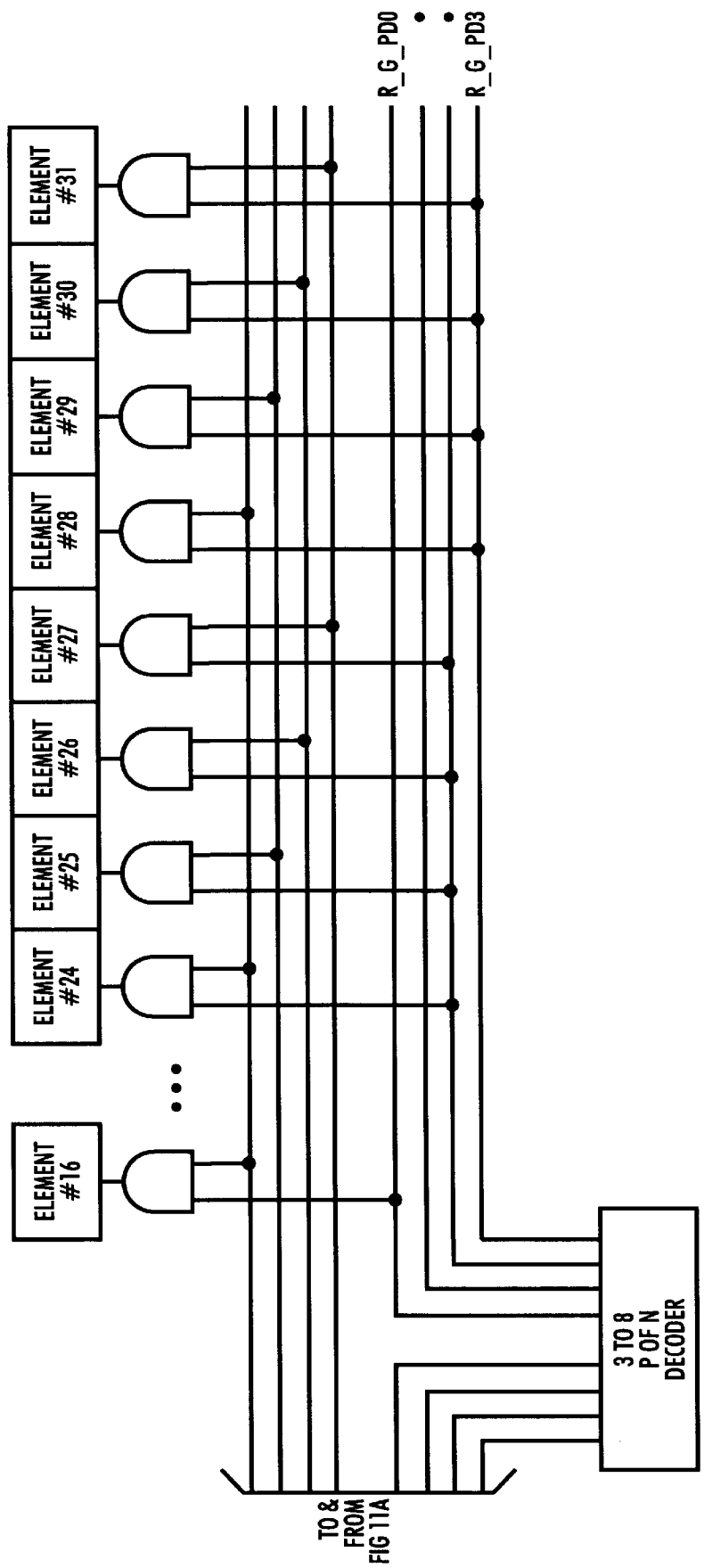

FIG. 11 demonstrates the increased efficiency afforded by splitting a set of addressing lines within a system which would allow the address control sector to be located midway along an array of addressed elements. All of the functional attributes of the system of FIG. 10 are preserved.

Figure 12:
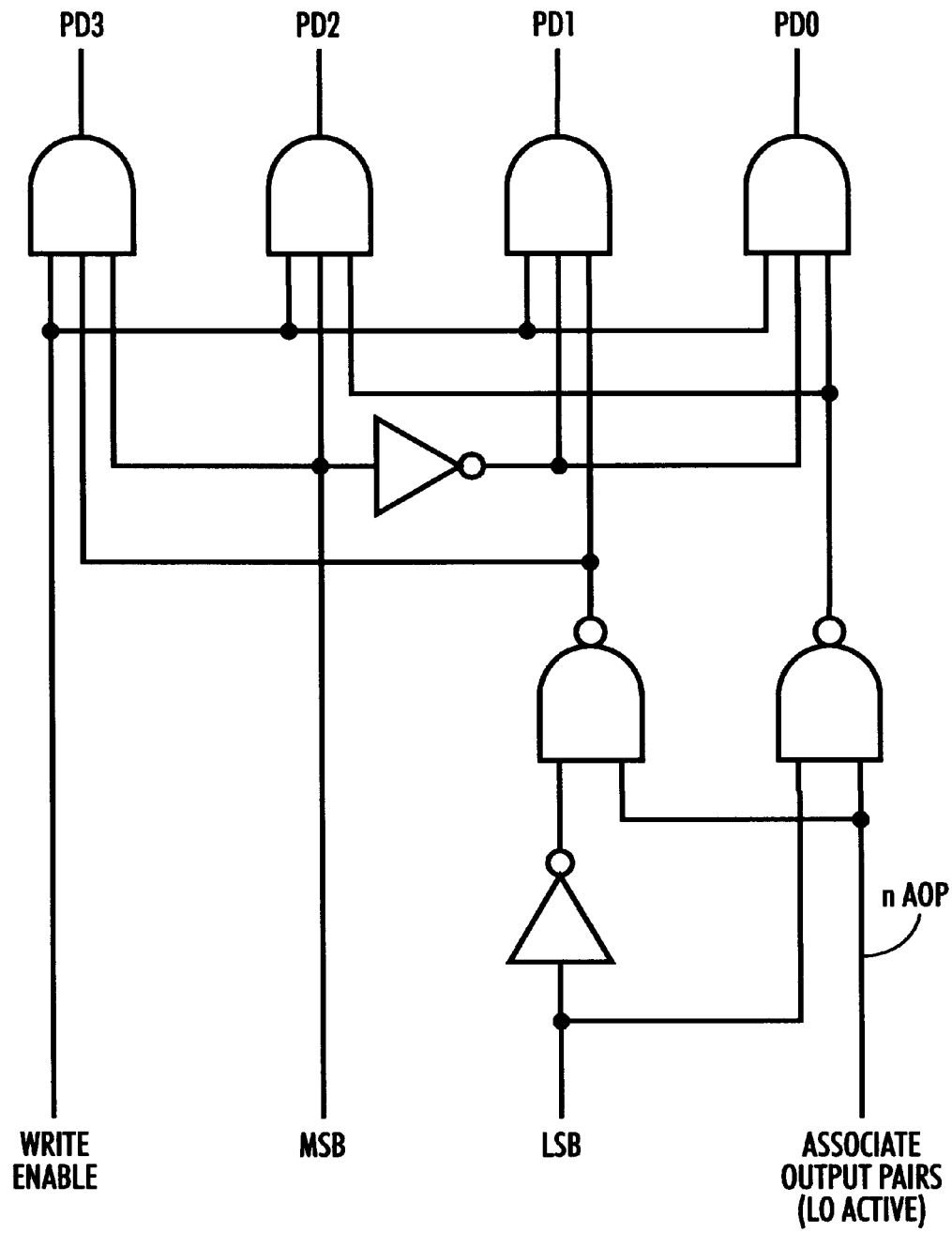
FIG. 12 is an example of a 2 to 4 p-of-n decoder.

FIG. 12 is an example of a 2 to 4 p of n decoder with the capability of associating the outputs PD0 with PD1 and outputs PD2 with PD3, as well as actuating these outputs individually. See FIG. 15 for a table of outputs resulting from inputs. Adjacent dual element or even dual group selection capability could be realized by any addressing system which incorporated in this device drive one or more of the addressing line sets which are taught by this invention. Larger decoders,—for example 3 to 8, or 4 to 16—can be easily designed by extrapolating upon the logic demonstrated by this example device. Other output patterns are possible by modifying or adding to the depicted logic. More generally, these decoding devices (i.e., digital circuits) can be used to convert any field of f binary inputs into a set of n (where n=2) mutually independent outputs which have a p to n output patterning capability through the use of additional inputs which actuate pre-determined associations between said outputs.

Figure 13:
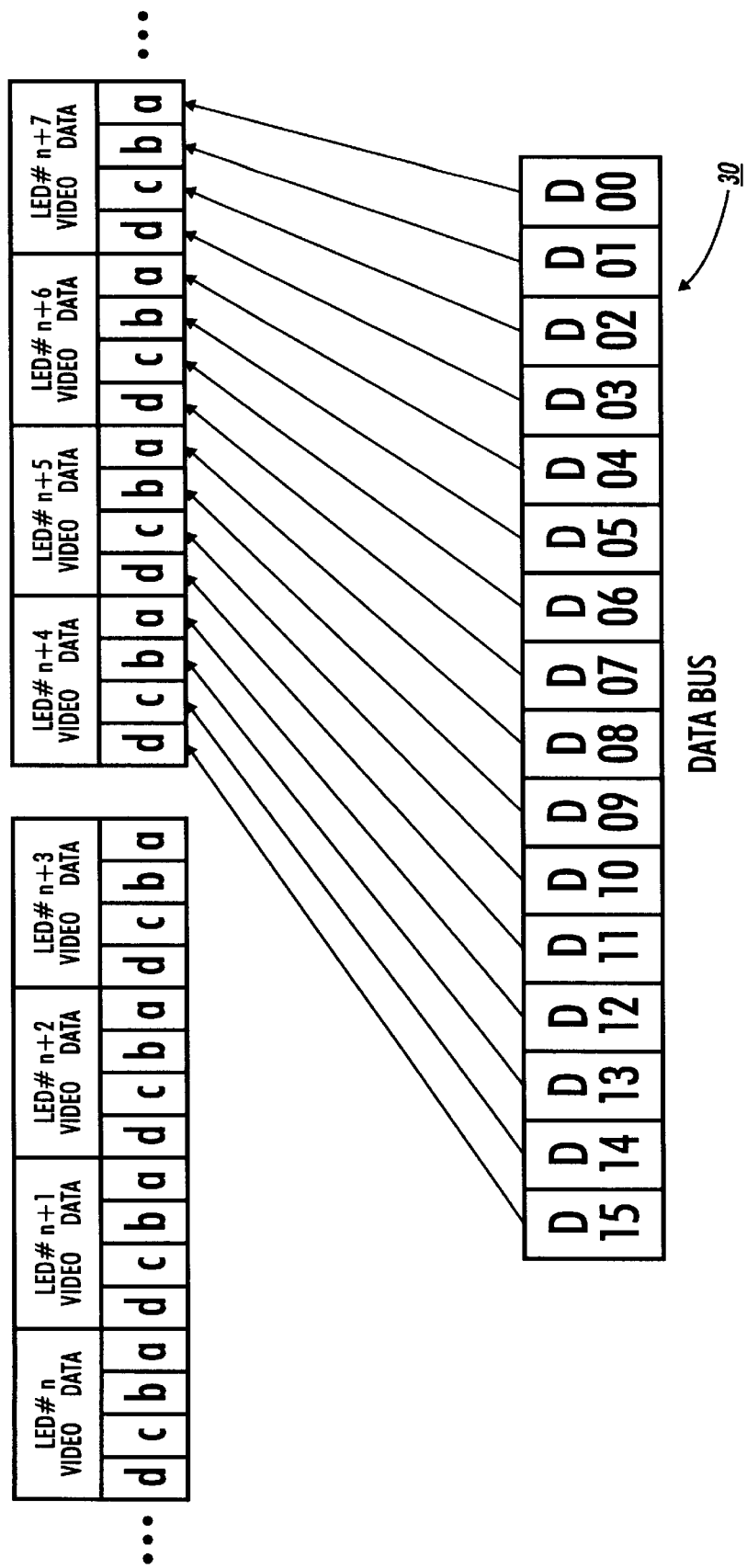
FIG. 13 shows video data entering one of the 32 elements in a single-element mode where each element is composed of 4 LED's each 4-bits gray vector mode.

FIG. 13 shows video data (gray vectors) entering one of the 32 registers when it is the only addressed element of a total of 32 elements which is selected. In this case, each element 21 of FIG. 2 is shown in FIG. 13 as having a 16 bit register, four bits per LED being used. Therefore, the 16 bit data bus 30 can supply data to four LED's of one element in parallel.

Figure 14:
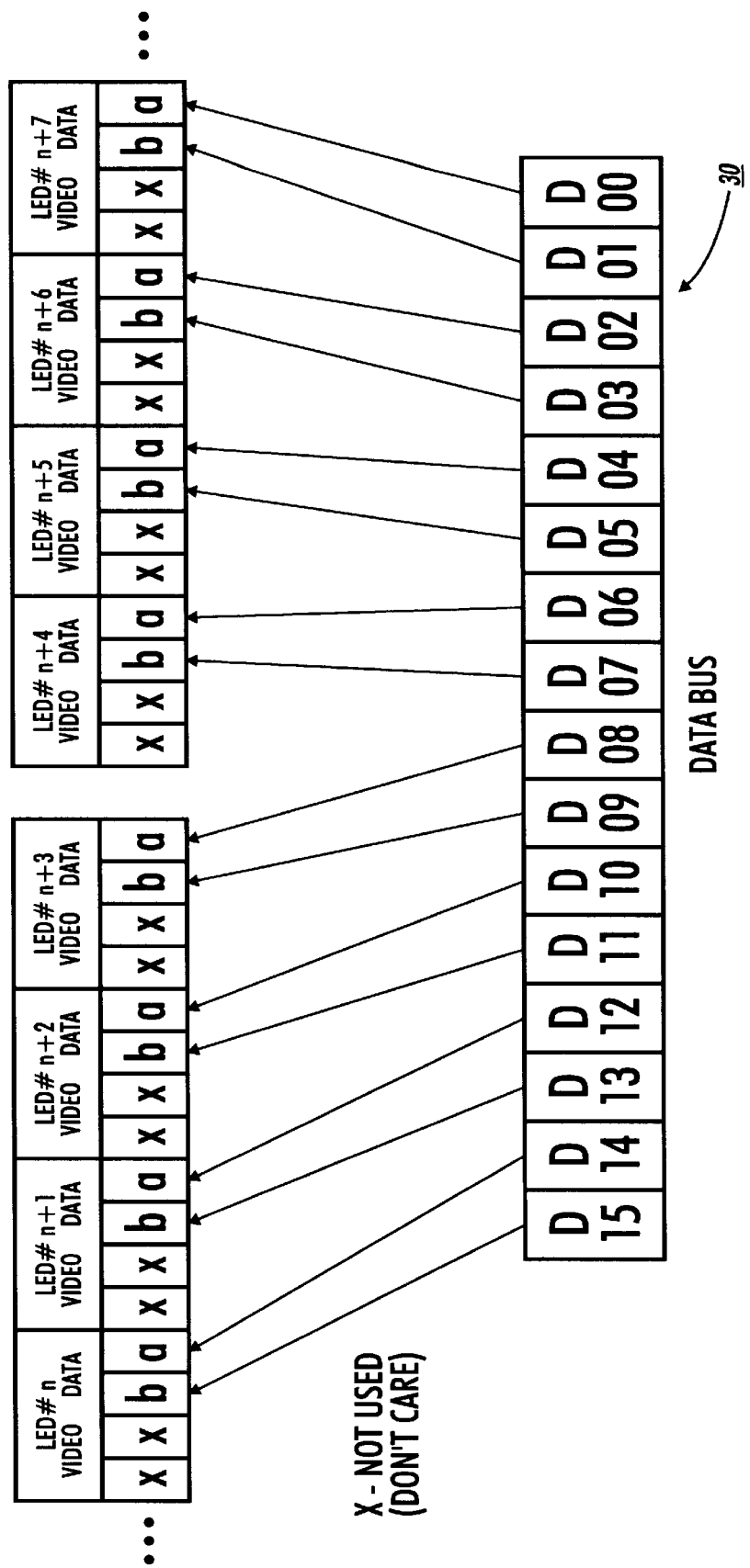
FIG. 14 shows video data entering two associated registersin a dual-element 2-bit gray vector mode.

FIG. 14 shows video data (gray vectors) entering two associated registers when they are both selected but there are only two bits per LED being used. Therefore, the 16 bit data bus 30 can supply data to eight LED's in two elements in parallel. This results in greater print speed at a cost of less image quality.

This addressing system also allows all LED's to be turned on in parallel for print bar calibration.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A system of address lines for coupling an address generator to $2^{m+n}$ addressed elements, said elements numbered modulo $2^m$ and separated into $2^{m+n-1}$ elements per left and right half, each half divided into $2^{n-1}$ groups and numbered from 0, each group having $2^m$ elements, comprising:

a first set of $2^{n-1}$ address lines numbered from 0, each address line coupling the address generator to the same numbered group of the left half, a second set of $2^{n-1}$ address lines numbered from 0, each address line coupling the address generator to the same numbered group of the right half, and a third set of $2^m$ address lines numbered from 0, each line coupling the address generator to all of the same numbered elements, and wherein each element will have as its inputs one line from said first or second set and one line from said third set.

2. The system of claim 1 wherein a write enable signal is ANDed to every address line in said third set.

3. The system of claim 1 wherein a write enable signal is ANDed to every address line in said first and second sets.

4. The system of claim 1 wherein said address lines are mutually independent lines and said address generator is adapted to turn ON any number of address lines at the same time.

5. The system of claim 1 wherein said address lines are mutually independent lines and said address generator is adapted to turn ON any number of address lines in any order.

* * * * *